United States Patent
Sukhadia et al.

(10) Patent No.: US 7,420,010 B2
(45) Date of Patent: Sep. 2, 2008

(54) POLYETHYLENE COMPOSITIONS

(75) Inventors: Ashish M. Sukhadia, Bartlesville, OK (US); Elizabeth M. Lanier, Bartlesville, OK (US); Louis Moore, Tulsa, OK (US)

(73) Assignee: Chevron Philips Chemical Company LP, The Woodlands, TX (US)

( * ) Notice: Subject to any disclaimer, the term of this patent is extended or adjusted under 35 U.S.C. 154(b) by 398 days.

(21) Appl. No.: 11/264,892

(22) Filed: Nov. 2, 2005

(65) Prior Publication Data

US 2007/0100047 A1    May 3, 2007

(51) Int. Cl.
C08K 5/69    (2006.01)

(52) U.S. Cl. .................. 524/394; 524/432; 524/502

(58) Field of Classification Search ............... 524/394, 524/432, 502, 544
See application file for complete search history.

(56) References Cited

U.S. PATENT DOCUMENTS

| | | | |
|---|---|---|---|
| 3,248,179 A | 4/1966 | Norwood | |
| 4,424,341 A | 1/1984 | Hanson et al. | |
| 4,501,885 A | 2/1985 | Sherk et al. | |
| 4,588,790 A | 5/1986 | Jenkins, III et al. | |
| 4,589,957 A | 5/1986 | Sherk et al. | |
| 4,613,484 A | 9/1986 | Ayres et al. | |
| 4,737,280 A | 4/1988 | Hanson | |
| 5,352,749 A | 10/1994 | DeChellis et al. | |
| 5,399,636 A | 3/1995 | Alt et al. | |
| 5,436,304 A | 7/1995 | Griffin et al. | |
| 5,455,314 A | 10/1995 | Burns et al. | |
| 5,565,175 A | 10/1996 | Hottovy et al. | |
| 5,565,592 A | 10/1996 | Patsidis et al. | |
| 5,575,979 A | 11/1996 | Hanson | |
| 5,597,892 A | 1/1997 | Hanson | |
| 5,707,590 A | 1/1998 | Thomas et al. | |
| 6,107,230 A | 8/2000 | McDaniel et al. | |
| 6,239,235 B1 | 5/2001 | Hottovy et al. | |
| 6,262,191 B1 | 7/2001 | Hottovy et al. | |
| 6,300,271 B1 | 10/2001 | McDaniel et al. | |

(Continued)

FOREIGN PATENT DOCUMENTS

EP    0850271    7/1998

(Continued)

OTHER PUBLICATIONS

International Search Report and Written Opinion, PCT/US06/042525, Mar. 28, 2007, 10 pgs.

(Continued)

*Primary Examiner*—Peter D. Mulcahy
*Assistant Examiner*—Henry Hu
(74) *Attorney, Agent, or Firm*—Conley Rose, P.C.; Rodney B. Carroll; Cheryl L. Huseman

(57) ABSTRACT

Polymeric compositions and methods of making same having improved coefficient of friction and blocking properties. The polymeric compositions include a linear low density polyethylene with additives such as a fluoroelastomer and an acid scavenger. The polymeric compositions may further comprise other additives such as antiblock agents, slip agents, stabilization additives, or combinations thereof. The methods include adding additives such as a fluoroelastomer and an acid scavenger to a polymer resin and forming end use articles such as film from the polymeric compositions.

20 Claims, 1 Drawing Sheet

U.S. PATENT DOCUMENTS

| | | | |
|---|---|---|---|
| 6,355,594 B1 | 3/2002 | McDaniel et al. | |
| 6,388,017 B1 | 5/2002 | McDaniel et al. | |
| 6,486,280 B1 * | 11/2002 | Anolick et al. | 526/243 |
| 6,534,609 B2 | 3/2003 | Mitchell et al. | |
| 6,642,310 B2 | 11/2003 | Chapman, Jr. et al. | |
| 6,734,252 B1 | 5/2004 | Woods | |
| 6,833,415 B2 | 12/2004 | Kendrick et al. | |
| 2004/0192818 A1 * | 9/2004 | Oriani et al. | 524/284 |
| 2007/0299184 A1 * | 12/2007 | Bloom | 524/437 |

FOREIGN PATENT DOCUMENTS

| | | |
|---|---|---|
| EP | 1462483 A1 | 9/2004 |
| EP | 1462483 A1 * | 9/2004 |
| WO | WO-95/21887 * | 8/1995 |
| WO | WO 95/21887 A1 | 8/1995 |
| WO | WO-2005/019334 A1 * | 3/2005 |
| WO | WO 2005/019334 A1 | 3/2005 |
| WO | WO 2005/111144 A1 | 11/2005 |

OTHER PUBLICATIONS

"MarFlexTM D143—Metallocene Linear Low Density Polyethylene," MarFlexTM Polyethylene—Superior Flexible Packaging Resins, MSDS #240370, Feb. 2005, pp. 1-2.

"Viton FreeFlow, All in Synonym List ELX201," Material Safety Data Sheet, Dupont Dow Elastomers L.L.C., May 19, 2004, pp. 1-10.

Johnson, B.V., et al., "Factors Affecting the Interaction of Polyolefin Additives with Fluorocarbon Elastomer Polymer Processing Aids," 1988 Polymers, Laminations and Coatings Conference, pp. 249-256.

"3M Material Safety Data Sheet," Dynamar (TM) FX-9613 Polymer Processing Additive, Dyneon LLC, May 19, 2003, pp. 1-9.

"3M Material Safety Data Sheet," Dynamar (TM) FX 9614X Polymer Processing Additive, Dyneon LLC, Jan. 26, 2004, pp. 1-8.

"Additiive Concentrates," Spartech Polycom Products, http://www.spartech.com/c-dp=color-specialty/ACtable.html, May 14, 2004, pp. 1-3.

Kurtus, Ron, "Determining the Coefficient of Friction," http://www.school-for-champions.com/science/frictioncoeff.htm, May 19, 2004, pp. 1-8.

"Principle of Action," Slip Agents Center, SpecialChem—Knowledge & Solution Provider, http://www.specialchem4polymers.com/tc/Slip-Agents/index.aspx?id=2647, May 19, 2004, pp. 1-2.

"Structure and Description of Primary Amides," Slip Agents Center, SpecialChem—Knowledge & Solution Provider, http://www.specialchem4polymers.com/tc/Slip-Agents/index.aspx?id=2648, May 19, 2004, pp. 1-2.

"Zinc Stearate," Metallic Stearates Center, SpecialChem—Knowledge & Solution Provider, http://www.specialchem4polymers.com/tc/Metallic-Stearates/index.aspx?id=2409, May 19, 2004.

"Acid Scavenger in PO," Metallic Stearates Center, SpecialChem—Knowledge & Solution Provider, http://www.specialchem4polymers.com/tc/Metallic-Stearates/index.aspx?id=2409, May 19, 2004, pp. 1-2.

"Coefficient of Friction Testing of Plastics," MatWeb—Material Property Data, http://www.matweb.com/reference/coefficient-of-friction.asp, May 19, 2004, pp. 1-2.

"Effect of Oleamide and Erucamide of CoF of Polyolefin Films," Slip Agents Center, SpecialChem—Knowledge & Solution Provider, http://www.specialchem4polymers.com/tc/Slip-Agents/index.aspx?id=2649, May 19, 2004, 1 pg.

"Friction," Force, http://hyperphysics.phy-astr.gsu.edu/hbase/frict.html, May 19, 2004, pp. 1-4.

"Standard Test for Wear Rate and Coefficient of Friction of Materials in Self-Lubricating Rubbing Contact with a Thrust Washer Using the Micro-Tribometer mod. UMT-2," ASTM D3702-94, http://www.cetr.com/ASTM_Standard/ASTM_D3702-94.htm, May 19, 2004, pp. 1-4.

* cited by examiner

POLYETHYLENE COMPOSITIONS

FIELD OF THE INVENTION

The present disclosure relates to polymeric compositions comprising one or more additives, and more specifically to combining polyethylene with additives such as a fluoroelastomer and an acid scavenger.

BACKGROUND OF THE INVENTION

Various properties of polymers, such as the slickness of the polymer or the blocking tendency, may be modified through use of additives. End-use articles may have various combinations of slickness and blocking depending upon their intended use. For example, it may be desirable for polymeric liners that protect the beds of trucks to have a low slickness or high coefficient of friction (COF) to prevent slipping and injury. As another example, it may be advantageous for a polymer such as those used to construct food coverings to be highly blocking. Alternatively, polymers used to construct commercial food packaging containers may be required to have a low blocking tendency in order to facilitate their opening under high-throughput manufacturing conditions. Thus, additives may be used to achieve desirable blocking and COF properties. However, as the levels of additives increase, other properties of the polymer may undesirably change. For example, as additive levels increase, polymer films may become hazy. Thus, a need exists for additives, alone or in combination, that modify the coefficient of friction and/or the blocking properties of polymers to achieve the desired characteristic for a particular application while maintaining other beneficial mechanical or optical properties.

SUMMARY OF THE INVENTION

Disclosed herein are polymeric compositions and methods of making same having improved coefficient of friction and blocking properties. The polymeric compositions disclosed herein include a linear low density polyethylene with additives such as a fluoroelastomer and an acid scavenger. The polymeric compositions may further comprise other additives such as antiblock agents, slip agents, stabilization additives, or combinations thereof. The methods disclosed herein include adding additives such as a fluoroelastomer and an acid scavenger to a polymer resin and forming end use articles such as film from the polymeric compositions.

DETAILED DESCRIPTION

Figure 1:
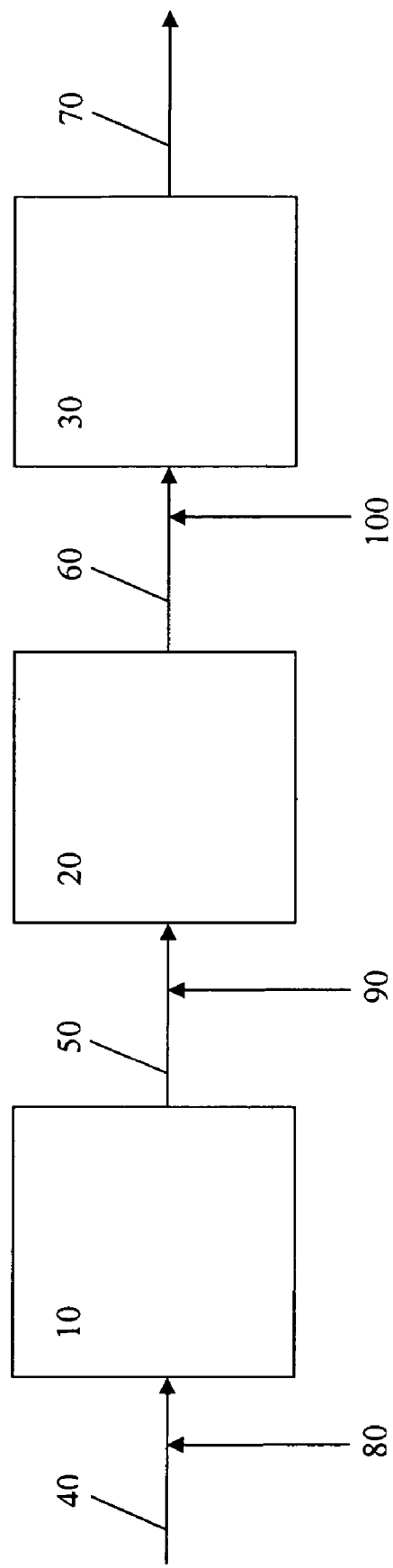
FIG. 1 is a schematic flow diagram of the addition of additive combinations according to the present disclosure.

Disclosed herein are polymeric compositions comprising a base polymer and one or more additives, typically a combination of two or more additives. The additives include without limitation polymer processing aids, antiblock agents, slip agents, acid scavengers, stabilization additives, or combinations thereof. Such additives may be used singularly or in combination as needed to impart the physical properties desired. The polymeric compositions may be fabricated into end-use articles such as films by methods and under conditions known to one skilled in the art.

The base polymer may be a polyolefin, for example a homopolymer, a copolymer, or blends thereof. In an aspect, the base polymer is a copolymer of ethylene with one or more comonomers such as alpha olefins. Examples of suitable comonomers include without limitation unsaturated hydrocarbons having from 3 to 20 carbon atoms such as propylene, 1-butene, 1-pentene, 1-hexene, 3-methyl-1-butene, 4-methyl-1-pentene, 1-heptene, 1-octene, 1-nonene, 1-decene, and mixtures thereof. In some aspects, the base polymer may be a polyethylene (PE), alternatively a low-density polyethylene (LDPE), alternatively a linear low-density polyethylene (LLDPE), or alternatively blends thereof. In an aspect, the base polymer is LLDPE having 1-hexene as a comonomer.

The resins of the present invention can be made by any olefin polymerization method known in the art, using various types of polymerization reactors. As used herein, "polymerization reactor" includes any polymerization reactor capable of polymerizing olefin monomers to produce homopolymers or copolymers. Such homopolymers and copolymers are referred to as resins or polymers. The various types of reactors include those that may be referred to as batch, slurry, gas-phase, solution, high pressure, tubular or autoclave reactors. Gas phase reactors may comprise fluidized bed reactors or staged horizontal reactors. Slurry reactors may comprise vertical or horizontal loops. High pressure reactors may comprise autoclave or tubular reactors. Reactor types can include batch or continuous processes. Continuous processes could use intermittent or continuous product discharge. Processes may also include partial or full direct recycle of un-reacted monomer, un-reacted comonomer, and/or diluent.

Polymerization reactor systems of the present invention may comprise one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas reactors, a combination of loop and gas reactors, multiple high pressure reactors or a combination of high pressure with loop and/or gas reactors. The multiple reactors may be operated in series or in parallel.

According to one aspect of the invention, the polymerization reactor system may comprise at least one loop slurry reactor. Such reactors are known in the art and may comprise vertical or horizontal loops. Monomer, diluent, catalyst and optionally any comonomer may be continuously fed to a loop reactor where polymerization occurs. Generally, continuous processes may comprise the continuous introduction of a monomer, a catalyst, and a diluent into a polymerization reactor and the continuous removal from this reactor of a suspension comprising polymer particles and the diluent. Reactor effluent may be flashed to remove the solid polymer from the liquids that comprise the diluent, monomer and/or comonomer. Various technologies may be used for this separation step including but not limited to, flashing that may include any combination of heat addition and pressure reduction; separation by cyclonic action in either a cyclone or hydrocyclone; or separation by centrifugation.

A typical slurry polymerization process (also known as the particle form process), which is well known in the art is disclosed, for example, in U.S. Pat. Nos. 3,248,179, 4,501, 885, 5,565,175, 5,575,979, 6,239,235, 6,262,191 and 6,833,415, each of which is incorporated by reference in its entirety herein.

Suitable diluents used in slurry polymerization are well known in the art and include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this invention, the polymerization reactor may comprise at least one gas phase reactor. Such systems are known in the art and may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790 and 5,436,304, each of which is incorporated by reference in its entirety herein.

According to still another aspect of the invention, a high pressure polymerization reactor may comprise a tubular reactor or an autoclave reactor, both of which are known in the art. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the invention, the polymerization reactor may comprise a solution polymerization reactor wherein the monomer is contacted with the catalyst composition by suitable stirring or other means. A carrier comprising an inert organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization. These reactors are known in the art.

Polymerization reactors suitable for the present invention may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide resin properties include temperature, pressure and the concentrations of various reactants. Polymerization temperature can affect catalyst productivity, polymer molecular weight and molecular weight distribution. Suitable polymerization temperature may be any temperature below the de-polymerization temperature according to the Gibbs Free energy equation. Typically this includes from about 60° C. to about 280° C., for example, and from about 70° C. to about 110° C., depending upon the type of polymerization reactor.

Suitable pressures will also vary according to the reactor and polymerization type. The pressure for liquid phase polymerizations in a loop reactor is typically less than 1000 psig. Pressure for gas phase polymerization is usually at about 200 -500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce resins with certain physical and mechanical properties. The proposed end-use product that will be formed by the resin and the method of forming that product determines the desired resin properties. Mechanical properties include tensile, flexural, impact, creep, stress relaxation and hardness tests. Physical properties include density, molecular weight, molecular weight distribution, melting temperature, glass transition temperature, temperature melt of crystallization, density, stereoregularity, crack growth, long chain branching and rheological measurements.

The concentrations of monomer, co-monomer, hydrogen, co-catalyst, modifiers, and electron donors are important in producing these resin properties. Comonomer is used to control product density. Hydrogen can be used to control product molecular weight. Co-catalysts can be used to alkylate, scavenge poisons and control molecular weight. Modifiers can be used to control product properties and electron donors affect stereoregularity. In addition, the concentration of poisons is minimized because poisons impact the reactions and product properties.

The polymer or resin may be formed into various articles, including, but not limited to, bottles, drums, toys, household containers, utensils, film products, drums, fuel tanks, pipes, geomembranes, and liners. Various processes may be used to form these articles, including, but not limited to, blow molding, extrusion molding, rotational molding, thermoforming, cast molding and the like. After polymerization, additives and modifiers can be added to the polymer to provide better processing during manufacturing and for desired properties in the end product. Additives include surface modifiers such as slip agents, antiblocks, tackifiers; antioxidants such as primary and secondary antioxidants; pigments; processing aids such as waxes/oils and fluoroelastomers; and special additives such as fire retardants, antistats, scavengers, absorbers, odor enhancers, and degradation agents.

In an aspect, the polymerization catalyst is a metallocene catalyst having an methylaluminoxane (MAO) activator such as those described in U.S. Pat. Nos. 5,565,592, 5,399,636 and 6,534,609 each of which is incorporated by reference herein in its entirety. Alternatively, the polymerization catalyst is a metallocene catalyst having an activator support (SSA) such as those described in U.S. Pat. Nos. 6,107,230, 6,300,271, 6,355,594 and 6,388,017 each of which is incorporated by reference herein in its entirety.

For a process such as the slurry polymerization of ethylene, ethylene is polymerized in a loop reactor and is present in the range of from about 1% to about 20% by the weight of the slurry. The slurry polymerization conditions are selected to ensure that the polymer being produced has certain desirable properties and is in the form of solid particles. The polymerization may be carried out below a temperature at which the polymer swells or goes into solution. For example, the polymerization temperature may be in the range of from about 85° C. to about 110° C. Specific methods and conditions for the preparation of polyolefins such as LLDPE are disclosed in U.S. Pat Nos. 4,424,341, 4,501,855, 4,613,484, 4,589,957, 4,737,280, 5,597,892, and 5,575,979, each of which is incorporated by reference herein in its entirety.

In an aspect, the base polymer is a metallocene catalyzed LLDPE (mLLDPE) copolymer of ethylene with from about 0.2 to about 0.5 mole % 1-hexene. Without limitation, representative examples of a suitable mLLDPE of ethylene with 1-hexene include MARFLEX® D143 and D157 polyethylene both of which are metallocene catalyzed mLLDPE resins that are manufactured by Chevron Phillips Chemical Company LP, The Woodlands, Tex. A suitable mLLDPE of ethylene and 1-hexene has about the physical properties given in Table 1. Unless otherwise specified herein, the physical properties disclosed herein were determined in accordance with the test methods recited in Table 1.

be copolymerized to yield suitable fluoroelastomers, include vinylidene fluoride, hexafluoropropylene, chlorotrifluoroethylene, tetrafluoroethylene and perfluoroalkyl perfluorovinyl ethers. Specific examples of the fluoroelastomers which may be employed include copolymers of vinylidene fluoride and a comonomer selected from hexafluoropropylene, chlorotrifluoroethylene, 1-hydropentafluoropropylene, and 2-hydropentafluoropropylene; copolymers of vinylidene fluoride, tetrafluoroethylene, and hexafluoropropylene or 1- or 2-hydropentafluoropropylene; and copolymers of tetrafluoroethylene, propylene and, optionally, vinylidene fluoride.

In an aspect, the fluoroelastomer (i) comprises predominantly large particle size fluoroelastomers, for example a weight average particle size of from about 2 and about 10 microns; (ii) has a fluid state at room temperature and above, i.e., has a glass transition temperature ($T_g$) below room temperature and exhibits little or no crystallinity at room temperature; (iii) comprises an interfacial agent of a polycaprolactone having a number average molecular weight in the range of about 1000 to about 32000 in a weight ratio of polycaprolactone to fluoroelastomer of less than about 5:1; or (iv) combinations thereof. Alternatively, any fluoroelastomer comprising a caprolactone interfacial agent in a weight percent of about 60% may be used. In an aspect, the PPA is a fluoroelastomer known as VITON ® FREEFLOW™ Z -200 ("Z-200") produced by Dupont Dow Elastomers of Wilmington, Del. Alternatively, the PPA is a fluoroelastomer known as DYNAMAR FX5929 produced by Dyneon, a 3M Company.

TABLE 1

| | English | SI | Method |
|---|---|---|---|
| Nominal Resin Properties | | | |
| Density | — | 0.916 g/cm³ | ASTM D 1505 |
| Melt Index, 190 C/2.16 Kg | — | 1.4 g/10 min | ASTM D 1238 |
| Nominal Blown Film Properties at 1.00 mil (25 micron) | | | |
| Haze | 4% | 4% | ASTM D 1003 |
| Gloss, 60° | 130 | 130 | ASTM D 2457 |
| COF | 1 | 1 | ASTM D 1894 |
| Dart Impact (g) | 1100 g/mil | 44 g/μm | ASTM D 1709 |
| Elmendorf Tear MD (g) | 225 g/mil | 5.6 g/μm | ASTM D 1922 |
| Elmendorf Tear TD (g) | 375 g/mil | 15 g/μm | ASTM D 1922 |
| Tensile Strength at Yield MD | 1600 psi | 11 MPa | ASTM D 882 |
| Tensile Strength at Yield TD | 1500 psi | 10 MPa | ASTM D 882 |
| Tensile Strength at Break MD | 6700 psi | 46 MPa | ASTM D 882 |
| Tensile Strength at Break TD | 5200 psi | 36 MPa | ASTM D 882 |
| Tensile Strength Elongation at Break MD | 500% | 500% | ASTM D 882 |

MD = machine direction
TD = transverse direction

The polymeric compositions may comprise one or more polymer processing aids (PPAs), which may be added to the polymer to improve the processing characteristics of the polymer and to eliminate surface related imperfections that occur during processing. The benefits of PPAs include elimination of melt fracture, lower extrusion pressures and motor loads and improved die/extruder clean up. For example, the addition of PPAs to LLDPE may help prevent sharkskin melt fracture (SSMF or sharkskin), which is a surface imperfection characterized by a pattern of surface ridges perpendicular to the flow direction. Examples of PPAs suitable for use with polyethylene resins include without limitation fluoroelastomers, polyethylene glycol and low molecular weight PE waxes. In an aspect, the PPA is a fluoroelastomer.

As used herein, fluoroelastomer refers to polymers that contain atoms of fluorine. Fluorinated monomers, which may Additional fluoroelastomers suitable for use herein are disclosed in U.S. Pat. No. 6,642,310, which is incorporated herein by reference in its entirety. In some aspects, the fluoroelastomer may be present in the polymeric composition in amounts of about 25 ppm to about 2000 ppm, alternatively from about 75 ppm to about 1500 ppm, alternatively from about 100 ppm to about 1200 ppm, each based on the weight of the base polymer.

The polymeric compositions may comprise one or more antiblock agents. The adherence of polymeric surfaces to each other is termed blocking, and antiblock agents may be added to the polymeric composition in effective amounts to reduce the degree to which polymeric surfaces (e.g., film surfaces) adhere to each other as evinced by a reduction in measured parameters such as grams for blocking. In an aspect, the antiblock or slip agent is any compound capable of decreasing the blocking tendency of the polymeric composition that is chemically compatible with the polymeric composition. In an aspect, the antiblock agents are particulate materials. Antiblock agents are well known to those skilled in the art and include without limitation silica, talc, calcium carbonate, or combinations thereof. The antiblock agent may be present in the polymeric composition in amounts ranging from about 500 ppm to about 10,000 ppm, alternatively from about 1000 ppm to about 8000 ppm, each based on the weight of the base polymer.

The polymeric compositions may comprise one or more slip agents. The COF is a unitless number that represents slip, i.e., the resistance to sliding of two surfaces in contact with one another. Slip agents may be added to the polymeric compositions in effective amounts to reduce the COF of a surface of the polymeric composition in contact with another surface. In an aspect, the slip agents are chemical lubricants, in contrast to particulate material. Slip agents are similarly well known to those skilled in the art and include without limitation fatty acid amides such as erucamide, oleamide, or combinations thereof. The slip agent may be present in the polymeric composition in amounts ranging from about 50 ppm to about 1000 ppm, alternatively from about 100 ppm to about 800 ppm, each based on the weight of the base polymer.

The polymeric compositions may comprise one or more acid scavengers. As used herein, an acid scavenger refers to bases that react with acidic catalyst residues. In an aspect, the acid scavenger is any compound chemically compatible with the polymeric composition and present in an amount effective to neutralize the acidic catalyst residues. For example, the acid scavenger may comprise a metal stearate or stearic acid. In an aspect, the acid scavenger may comprise CaSt, ZnSt, LiSt, or combinations thereof. Alternatively, the acid scavenger may comprise a metal oxide such as an oxide of zinc. The acid scavenger may be present as an additive in the polymer in amounts of about 25 ppm to about 2000 ppm, alternatively from about 75 ppm to about 1000 ppm, alternatively from about 100 ppm to about 800 ppm, each based on the weight of the base polymer.

In aspects comprising both a fluoroelastomer and an acid scavenger, the weight ratio of acid scavenger to fluoroelastomer may be in the range of about 1:1 to about 3:1, alternatively about 1.5:1 to about 2.5:1, alternatively about 1.75:1 to about 2:1.

The polymeric compositions may comprise other additives as deemed necessary to impart the desired properties. In an aspect, any additive chemically compatible with the polymeric composition and capable of imparting the desired properties may be included. Examples of such additives include without limitation optical property modifiers and stabilization additives. Optical property modifiers include without limitation clarifiers, haze reducers, optical brighteners, or combinations thereof. Stabilization additives include without limitation antistatic agents, primary antioxidants, secondary antioxidants, thermal stabilizer agents, ultraviolet stabilizer agents, or combinations thereof. Such additives may be used singularly or in combination in effective amounts as necessary to impart the desired properties.

In an aspect, the polymeric compositions of this disclosure comprise a mLLDPE, a fluoroelastomer, an acid scavenger, and optionally other additives as needed to impart the desired physical properties. Such compositions may exhibit an increased COF and blocking when compared to the mLLDPE in the absence of the aforementioned additives. Polymeric composition comprising mLLDPE, a fluoroelastomer, and an acid scavenger may exhibit a $COF_{static}$ of from about 0.5 to about 3.0, alternatively from about 0.65 to about 3.0. In some aspects, the further addition of an antiblock and/or slip agent to polymeric composition comprising mLLDPE, a fluoroelastomer, and an acid scavenger may reduce the blocking and COF. In other aspects, the addition of an antiblock and/or slip agent to the polymeric composition comprising a mLLDPE, a fluoroelastomer, and an acid scavenger may have minimal to no effect on the enhanced COF and blocking.

In an aspect, the one or more of the additives disclosed herein are added to the base polymer by any means or methods suitable for incorporation of these agents into a polymeric resin. Such methods can include any physical mixing process, such as tumble blending of a base polymer and one or more additives in a mixer, for example, a Banbury mixer. For purposes of explanation, tumble blending may be used to describe the present invention. Blends can also be made by extrusion blending where the mixing in the extruder is used to blend the components of the polymeric compositions.

Referring to FIG. 1, a base polymer such as fluff from a polymerization reactor is fed via feedstream 40 to a tumble blending process 10, after which a blended polymer is fed via stream 50 to a pellitization process 20, after which a pelletized polymer is fed via stream 60 to an shaping process 30, after which a final product such as a blown film or extruded article is recovered via line 70. Shaping process 30 may include a number of known polymer shaping or forming techniques such as extrusion, compression, blow molding, injection molding, thermoforming, rotomolding, vacuum forming, film blowing, film casting, and the like. In an aspect, the polymer composition is blown into a film. In an aspect, an end use article is produced such as a vehicle bed liner.

One or more additives as disclosed herein may be added via stream 80 during tumble blending 10, added via stream 90 during pelletization 20 of the blended polymer, added via stream 100 during shaping 30 of the pelletized polymer, or combinations thereof. While additive streams are shown connected to feed streams 40, 50, and 60, respectively, it should be understood that the additives may be added directly into the processing units 10, 20, and 30, respectively. The additives may be added to the base polymer during other steps in the process. For example, a fluoroelastomer and/or an acid scavenger may be (i) added via preparation of a master batch with the base polymer, (ii) added to the neat resin at extrusion, or (iii) added separately prior to manufacture of the film or other product by an end user. The additives as disclosed herein are added about concurrently during a given process step, for example the fluoroelastomer and acid scavenger are added about concurrently during tumble blending. Alternatively, the additives may be added sequentially during the same or different process steps.

EXAMPLES

For the following examples, 400 pounds of mLLDPE resin A and 400 pounds of mLLDPE resin B were tumble blended with the additives as described herein. Resin A is a metallocene/MAO catalyzed LLDPE with 1-hexene as copolymer, and Resin B is a metallocene/SSA catalyzed LLDPE with 1-hexene as copolymer. The additives include combinations selected from the following compounds: a primary stabilizer known as IRGANOX 1010, a hindered phenol primary stabilizer available from Ciba; a secondary stabilizer known as IRGAFOS 168, which is a phosphite stabilizer available from Ciba; acid scavengers such as ZnSt and/or ZnO; an antiblock agent known as POLYBLOCK, which is a talc based antiblocking agent available from Specialty Minerals; a slip agent known as KEMAMIDE E, which is a fatty acid amide available from Chemtura; and fluoroelastomers known as FX9613, FX9614, E19106, and Z-200 (described previously). E19106 is also known as DYNAMAR FX5929 and was previously described herein. DYNAMAR FX9613 and FX9614 are fluoroelastomers available from Dyneon, a 3M Company. The blends were then pelletized using a ZSK-40 extruder and subsequently extruded and blown into film. The film was physical property tested, and the results are listed in Table 2.

TABLE 2

|  | E1 | E2 | CE1 | CE2 | CE3 |
|---|---|---|---|---|---|
| Additive |  |  |  |  |  |
| IRGANOX 1010 (wt. %) | 0.10 | 0.10 | 0.10 | 0.10 | 0.10 |
| IRGAFOS 168 (wt. %) | 0.15 | 0.15 | 0.15 | 0.15 | 0.15 |
| ZnSt (wt. %) | 0.05 | 0.05 | 0.05 | 0.05 | 0 |
| ZnO (wt. %) | 0 | 0 | 0 | 0 | 0.05 |
| 50% POLYBLOCK (wt. %) | 0 | 0 | 0 | 0 | 0 |
| KEMAMIDE E (wt. %) | 0 | 0 | 0 | 0 | 0 |
| FX9613 fluoroelastomer (wt. %) | 0 | 0 | 0.07 | 0 | 0 |
| FX9614 fluoroelastomer (wt. %) | 0 | 0 | 0 | 0.035 | 0 |
| Z-200 (wt. %) | 0.035 | 0.02 | 0 | 0 | 0.035 |
| Film Properties |  |  |  |  |  |
| Gauge (mil) | 0.94 | 0.93 | 0.95 | 0.86 | 0.95 |
| Elmendorf Tear MD (g) | 255 | 289 | 241 | 220 | 232 |
| Elmendorf Tear TD (g) | 440 | 436 | 425 | 423 | 429 |
| Dart Impact (g) | 1548 | 1532 | 1540 | 1520 | 1570 |
| Haze (%) | 2.9 | 3.1 | 3.9 | 4.1 | 3.5 |
| Gloss 45 (%) | 85 | 81 | 77 | 74 | 81 |
| Gloss 60 (%) | 139 | 132 | 126 | 120 | 133 |
| $COF_{static}$ | 2.1 | 2.5 | 1.5 | 1.2 | 1.1 |
| $COF_{kinetic}$ | 0.92 | 1.60 | 0.86 | 0.55 | 0.90 |

Example 1

Batch E1 of mLLDPE resin A was prepared by tumble blending 0.05 wt. % of the acid scavenger ZnSt, 0.035 wt. % of the fluoroelastomer Z-200, 0.10 wt. % IRGANOX 1010, and 0.15 wt. % IRGAFOS 168 to form a blended polymer, which was subsequently pelletized and extruded into film. The resulting film had a blocking $COF_{static}$ of 2.1 as measured by ASTM D 1894 and was so highly blocking that it was very difficult to separate.

Example 2

Batch E2, similar to Batch E1, was created with the difference that E2 contained 0.02 wt. % of the fluoroelastomer Z-200. Surprisingly, an even greater increase in blocking properties was observed in the resulting film, which had a blocking $COF_{static}$ of 2.5. Thus, Example E2 showing that the blocking properties increased with a lower level of fluoroelastomer indicates that the ratio of fluoroelastomer to acid scavenger may be of interest.

Comparative Examples

In comparative example CE1 a batch similar to that of Example E1 was prepared except that 0.07 wt. % of the fluoroelastomer FX9613 was used instead of the fluoroelastomer Z-200. The blocking properties of the resulting film were far lower (i.e., $COF_{static}$ of 1.5) than those of Examples E1 and E2 even though relatively more PPA was used.

In comparative example CE2, 0.035 wt. % of the fluoroelastomer FX9614 was used instead of the fluoroelastomer FX9613. As with the comparative example CE1 the resultant film had a much lower blocking properties (i.e., $COF_{static}$ of 1.2) than those of the films of Examples E1 and E2 even though equal amounts or more of the fluoroelastomer were used.

Comparative example CE3 is similar to Example E1 in that Z-200 was used as the fluoroelastomer, however, 0.05 wt. % of the acid scavenger ZnO was substituted for the ZnSt. It was observed that the blocking $COF_{static}$ was measured at only 1.1, almost half the blocking $COF_{static}$ measured when ZnSt was used as an acid scavenger.

Upon review of results from the examples and comparative examples described above, it is believed that a synergistic effect occurs when fluoroelastomers such as those described above (e.g., Z-200) and acid scavengers such as those described above (e.g., ZnSt) are used in the preparation of, e.g., polyethylene films. Without intending to be limited by theory, it is believed that the synergistic effect causes a greater than expected increase in blocking properties and coefficient of static friction. Particularly, it is believed that the relative amounts of fluoroelastomer and acid scavenger may have an unexpected effect such that lower absolute amounts at optimized ratios may modify the blocking and friction properties of the polymer more than greater absolute amounts.

Different polymeric compositions were prepared each having an acid scavenger: ZnSt or ZnO; a fluoroelastomer: Z-200, E19106, FX9614 or FX9613; and a stabilizer: IRGANOX 1010 and/or IRGAFOS 168. These PPAs were added to the mLLDPE resin B to form a blended polymer, which was subsequently pelletized and extruded into film. The amounts of each PPA present in the different formulations are presented in Table 3 along with the measured physical properties of the blown film prepared from each formulation.

TABLE 3

| PPA | CE4 wt. % | CE5 wt. % | E3 wt. % | E4 wt. % |
|---|---|---|---|---|
| IRGANOX 1010 | 0.1 | 0.1 | 0.1 | 0.1 |
| IRGAFOS 168 | 0.15 | 0.15 | 0.15 | 0.15 |
| ZnSt | 0.05 | 0.05 | — | — |
| ZnO | — | — | 0.05 | 0.05 |
| FX9613 | 0.070 | 0.070 | — | — |

TABLE 3-continued

| PPA | CE4 wt. % | CE5 wt. % | E3 wt. % | E4 wt. % |
|---|---|---|---|---|
| FX9614 | — | — | — | — |
| E19106 | — | — | — | 0.040 |
| Z-200 | — | — | 0.040 | — |
| Gauge (mil) | 1.02 | 1.03 | 1.04 | 1.02 |
| COF$_{static}$ | 0.74 | 0.74 | 1.6 | 2.6 |
| COF$_{kinetic}$ | 0.47 | 0.52 | 1.2 | 1.1 |
| Elmendorf Tear MD (g) | 308 | 291 | 259 | 300 |
| Elmendorf Tear TD (g) | 264 | 444 | 454 | 436 |
| Dart Impact (g) | 1,570 | 1,570 | 1,570 | 1,570 |
| Puncture (lb-in) (per ASTM D 3763-02) | 67 | 66 | 65 | 62 |
| Haze (%) | 3.0 | 3.4 | 3.1 | 3.6 |
| Gloss 45 (%) | 84 | 82 | 84 | 80 |
| Gloss 60 (%) | 134 | 134 | 136 | 129 |
| Seal Strength (lb/in) (per ASTM F 88-05) | 1.12 | 1.15 | 1.08 | 1.05 |
| Seal Init (° C.) (per ASTM F 2029-00) | 96.1 | 96.2 | 96.1 | 95.8 |

Example 3

Batch E3 of mLLDPE resin B was prepared by tumble blending 0.05 wt. % of the acid scavenger ZnO, 0.04 wt. % of the fluoroelastomer Z-200, 0.10 wt. % IRGANOX 1010, and 0.15 wt. % IRGAFOS 168 to form a blended polymer, which was subsequently pelletized and extruded into film. The resulting film had increased blocking with a COF$_{static}$ of 1.6 as measured by ASTM D 1894.

Example 4

Batch E4 of mLLDPE resin B containing PPAs was similar to that of Batch E3 with the difference being that the fluoroelastomer E19106, also known as FX5929, was substituted for the Z-200 fluoroelastomer. The resulting film had an increased blocking with COF$_{static}$ of 2.6 when compared to that of Batch E3 with a COF$_{static}$ of 1.6 as measured by ASTM D 1894.

Comparative Examples

In comparative examples CE4 and CE5, a batch similar to that of Example E3 was prepared except that the acid scavenger was ZnSt instead of ZnO and the fluropolymer used in both CE3 and CE4 was FX9613. The blocking properties of the resulting film were far lower (i.e., COF$_{static}$ of 0.74) than those of Examples E3 and E4 even though relatively more PPA was used.

The results demonstrate the importance of the fluoroelastomer/acid scavenger combination in determining the level of COF$_{static}$ or blocking observed. The combined substitution of the fluoroelastomers Z-200 or E19106 for the fluoroelastomer FX9613 and the acid scavenger ZnO for ZnSt resulted in an unexpected increase in the COF$_{static}$ demonstrating the influence of the fluoroelastomer/acid scavenger combination on the blocking level observed.

Different polymeric compositions were prepared each having an acid scavenger: ZnSt or ZnO; a fluoroelastomer: Z-200, E19106, FX9614 or FX9613; a stabilizer: IRGANOX 1010 and/or IRGAFOS 168; the antiblock agents: 50% POLYBLOCK and KEMAMIDE E; and either mLLDPE resin A or B as the base polymer. The additives were added to the mLLDPE to form a blended polymer, which was subsequently pelletized and extruded into film. Examples E5 through E17 are for blown film prepared from the resin A, and Examples E 18 through E20 are for blown film prepared from the resin B. The amounts of each additive present in the different formulations are presented in Tables 4 and 5 along with the measured physical properties for films prepared from each formulation.

Example 5

Batch E5 of mLLDPE resin A was prepared by tumble blending 0.05 wt. % of the acid scavenger ZnSt, 0.014 wt. % of the fluoroelastomer FX9613, 0.10 wt. % IRGANOX 1010, 0.15 wt. % IRGAFOS 168, 0.10 wt. % KEMAMIDE E and 1.60 wt. % POLYBLOCK were added to form a blended polymer, which was subsequently pelletized and extruded into film. The resulting film had a blocking COF$_{static}$ of 0.14 as measured by ASTM D 1894.

Example 6

Batch E6 of mLLDPE resin A was similar to that of E5 with the difference being that the fluoroelastomer FX9614 was substituted for the FX9613 fluoroelastomer. The resulting film had a blocking similar to that observed in Batch E5 with a COF$_{static}$ of 0.14 as measured by ASTM D 1894.

Example 7

Batch E7 of mLLDPE resin A was similar to that of E6 with the difference being that the fluoroelastomer Z-200 was substituted for the FX9614 fluoroelastomer. The resulting film had a blocking similar to that observed in Batch E6 with a COF$_{static}$ of 0.13 as measured by ASTM D 1894.

Example 8

Batch E8 of mLLDPE resin A was similar to that of E7 with the difference being that the acid scavenger ZnO was substituted for ZnSt. The resulting film had a blocking similar to that observed in Batch E7 with a COF$_{static}$ of 0.11 as measured by ASTM D 1894.

Example 9

Batch E9 of mLLDPE resin A was similar to that of Batch E8 with the differences being that the formulation had a reduced amount of the Z-200 fluoroelastomer, 0.04 wt. % in Batch 9 compared to 0.07 wt. % in Batch E7 and a substitution of the acid scavenger ZnSt for ZnO. The resulting film had a blocking similar to that observed in Batch E8 with a COF$_{static}$ of 0.13 as measured by ASTM D 1894.

Example 10

Batch E10 of mLLDPE resin A was similar to that of Batch E9 with the difference being that Batch E10 contained 50% less fluoroelastomer and had the acid scavenger ZnO substituted for ZnSt. The resulting film had a blocking similar to that observed of in Batch E9 with a COF$_{static}$ of 0.14 as measured by ASTM D 1894.

Example 11

Batch E11 of mLLDPE resin A was similar to that of Batch E10 with the difference being that the fluoroelastomer Z-200 was present at 0.03 wt. % instead of 0.02 wt. %. The resulting film had a blocking similar to that observed in Batch E10 with a COF$_{static}$ of 0.16 as measured by ASTM D 1894.

Example 12

Batch E12 of mLLDPE resin A was similar to that of Batch E11 with the difference being that the fluoroelastomer Z-200 was present at 0.04 wt. % instead of 0.03 wt. %. The resulting film had a blocking similar to that observed in Batch E11 with a COF$_{static}$ of 0.15 as measured by ASTM D 1894.

Example 13

Batch E13 of mLLDPE resin A was similar to that of Batch E12 with the difference being that the fluoroelastomer FX9614 was substituted for the Z-200 fluoroelastomer. The resulting film had a blocking similar to that observed of Batch E12 with a COF$_{static}$ of 0.14 as measured by ASTM D 1894.

Example 17

Batch E17 of mLLDPE resin A was similar to that of Batch E16 with the difference being that Batch E17 contained 50% less fluoroelastomer. The resulting film had a blocking similar to that observed in Batch E16 with a COF$_{static}$ of 0.16 as measured by ASTM D 1894.

The results demonstrate that for the film formed from the resin A, which is a metallocene/MAO catalyzed mLLDPE, the presence of slip and antiblock agents reduced the COF$_{static}$ regardless of the additive combinations used when compared to similar polymeric compositions in the absence of such agents. Specifically, the COF$_{static}$ for E5 through E17 in Table 4 averaged 0.14 while the COF$_{static}$ for similar compositions in the absence of antiblock and slip agents, Table 2 E1 and E2 averaged 2.3.

TABLE 4

| Additive | E5 (wt. %) | E6 (wt. %) | E7 (wt. %) | E8 (wt. %) | E9 (wt. %) | E10 (wt. %) | E11 (wt. %) | E12 (wt. %) | E13 (wt. %) | E14 (wt. %) | E15 (wt. %) | E16 (wt. %) | E17 (wt. %) |
|---|---|---|---|---|---|---|---|---|---|---|---|---|---|
| IRGANOX 1010 | 0.10 | 0.10 | 0.10 | 0.10 | 0.10 | 0.10 | 0.10 | 0.10 | 0.10 | 0.10 | 0.10 | 0.10 | 0.10 |
| IRGAFOS 168 | 0.15 | 0.15 | 0.15 | 0.15 | 0.15 | 0.15 | 0.15 | 0.15 | 0.15 | 0.15 | 0.15 | 0.15 | 0.15 |
| ZnSt | 0.05 | 0.05 | 0.05 | — | 0.05 | — | — | — | — | — | — | — | — |
| ZnO | — | — | — | 0.05 | — | 0.05 | 0.05 | 0.05 | 0.05 | 0.05 | 0.05 | 0.05 | 0.05 |
| FX9613 | 0.14 | — | — | — | — | — | — | — | — | — | — | — | — |
| FX9614 | — | 0.07 | — | — | — | — | — | — | — | 0.02 | 0.03 | 0.04 | — | — |
| E19106 | — | — | — | — | — | — | — | — | — | — | — | 0.02 | 0.04 |
| Z-200 | — | — | 0.07 | 0.07 | 0.04 | 0.02 | 0.03 | 0.04 | — | — | — | — | — |
| KEMAMIDE E | 0.10 | 0.10 | 0.10 | 0.10 | 0.10 | 0.10 | 0.10 | 0.10 | 0.10 | 0.10 | 0.10 | 0.10 | 0.10 |
| 50% POLYBLOCK | 1.60 | 1.60 | 1.60 | 1.60 | 1.60 | 1.60 | 1.60 | 1.60 | 1.60 | 1.60 | 1.60 | 1.60 | 1.60 |
| Gauge (mil) | 0.98 | 0.96 | 0.97 | 0.98 | 0.98 | 1.01 | 1.01 | 1.00 | 1.01 | 0.96 | 1.02 | 0.98 | 0.96 |
| COF$_{static}$ | 0.14 | 0.14 | 0.13 | 0.11 | 0.13 | 0.14 | 0.16 | 0.15 | 0.14 | 0.15 | 0.14 | 0.14 | 0.16 |
| COF$_{kinetic}$ | 0.09 | 0.09 | 0.10 | 0.06 | 0.09 | 0.10 | 0.11 | 0.09 | 0.10 | 0.10 | 0.09 | 0.09 | 0.10 |
| Elmendorf Tear MD (g) | 190 | 222 | 226 | 196 | 211 | 234 | 238 | 255 | 260 | 238 | 240 | 238 | 232 |
| Elmendorf Tear TD (g) | 430 | 410 | 414 | 434 | 442 | 365 | 410 | 370 | 370 | 362 | 387 | 358 | 353 |
| Dart Impact (g) | 926 | 814 | 816 | 824 | 718 | 872 | 972 | 882 | 940 | 882 | 928 | 916 | 888 |
| Puncture (lb-in) (per ASTM D 3763-02) | — | — | — | — | — | 20.5 | 25.0 | 20.9 | 20.6 | 22.3 | 23.9 | 20.6 | 25.2 |
| Haze (%) | 13.0 | 12.8 | 15.2 | 14.6 | 12.5 | 13.6 | 11.7 | 13.9 | 12.7 | 15.1 | 13.6 | 14.6 | 12.8 |
| Gloss 45 (%) | 62 | 64 | 58 | 58 | 60 | 56 | 64 | 57 | 62 | 57 | 62 | 53 | 58 |
| Gloss 60 (%) | 89 | 90 | 84 | 84 | 85 | 78 | 91 | 78 | 86 | 80 | 86 | 73 | 86 |

Example 14

Batch E14 of mLLDPE resin A was similar to that of Batch E13 with the difference being that the fluoroelastomer FX9614 was present at 0.03 wt. % instead of 0.02 wt. % resulting in a blocking similar to that observed in Batch E13 with a COF$_{static}$ of 0.15 as measured by ASTM D 1894.

Example 15

Batch E15 of mLLDPE resin A was similar to that of Batch E14 with the difference being that the fluoroelastomer FX9614 was present at 0.04 wt. % instead of 0.03 wt. % resulting in a blocking similar to that observed in Batch E14 with a COF$_{static}$ of 0.14 as measured by ASTM D 1894.

Example 16

Batch E16 of mLLDPE resin A was similar to that of Batch E15 with the difference being that the fluoroelastomer E19106 was substituted for the FX9614 fluoroelastomer. The resulting film had a blocking similar to that observed in Batch E15 with a COF$_{static}$ of 0.14 as measured by ASTM D 1894.

Example 18

Batch E18 of mLLDPE resin B was prepared by tumble blending 0.05 wt. % of the acid scavenger ZnO, 0.04 wt. % of the fluoroelastomer Z-200, 0.10 wt. % IRGANOX 1010, 0.15 wt. % IRGAFOS 168, 0.10 wt. % KEMAMIDE E, and 1.60 wt. % POLYBLOCK to form a blended polymer, which was subsequently pelletized and extruded into film. The resulting film had a blocking COF$_{static}$ of 0.14 as measured by ASTM D 1894.

Example 19

Batch E19 of mLLDPE resin B was similar to that of Batch E18 with the difference being that Batch E19 has the E19106 fluoroelastomer substituted for the Z-200 fluoroelastomer. The resulting film had an increased blocking when compared to that seen with Batch E18. Specifically the COF$_{static}$ increased from 0.14 to 0.75 as measured by ASTM D 1894.

Example 20

Batch E20 of mLLDPE resin B was similar to that of Batch E19 with the difference being that E20 has the FX9613 fluoroelastomer substituted for the E19106 fluoroelastomer. The resulting film had a reduced blocking with a $COF_{static}$ of 0.17 compared to the $COF_{static}$ of 0.75 seen for Batch E19 with E19106 as the fluoroelastomer.

TABLE 5

| Additive | E18 wt. % | E19 wt. % | E20 wt. % |
|---|---|---|---|
| IRGANOX 1010 | 0.10 | 0.10 | 0.10 |
| IRGAFOS168 | 0.15 | 0.15 | 0.15 |
| ZnSt | — | — | 0.05 |
| ZnO | 0.05 | 0.05 | — |
| FX9613 | — | — | 0.07 |
| FX9614 | — | — | — |
| E19106 | — | 0.04 | — |
| Z-200 | 0.04 | — | — |
| KEMAMIDE E | 0.10 | 0.10 | 0.10 |
| 50% POLYBLOCK | 1.60 | 1.60 | 1.60 |
| Gauge (mil) | 1.05 | 1.02 | 1.03 |
| $COF_{static}$ | 0.14 | 0.75 | 0.17 |
| $COF_{kinetic}$ | 0.10 | 0.79 | 0.11 |
| Elmendorf Tear MD (g) | 246 | 247 | 217 |
| Elmendorf Tear TD (g) | 428 | 449 | 367 |
| Dart Impact (g) | 970 | 1,040 | 1,062 |
| Puncture (lb-in) (per ASTM D 3763-02) | 21.0 | 22.0 | 21.0 |
| Haze (%) | 12.3 | 13.7 | 12.6 |
| Gloss 45 (%) | 63 | 59 | 63 |
| Gloss 60 (%) | 89 | 83 | 88 |
| Seal Strength (lb/in) (per ASTM F 88-05) | 1.08 | 1.15 | 1.06 |
| Seal Init (° C.) (per ASTM F 2029-00) | 96.9 | 96.4 | 96.9 |

Table 5 lists test results for film formed from polymeric compositions comprising metallocene/SSA catalyzed mLL-DPE resin B, the acid scavenger ZnSt or ZnO and the fluoroelastomers Z-200 or FX 9613. Examples E18 or E20 had a reduced $COF_{static}$ when antiblock or slip agents were added to the compositions compared to similar compositions in the absence of these agents, as shown in Table 3, Examples E3 and E4. However, polymeric compositions comprising metallocene/SSA catalyzed mLLDPE resin B, E19106 fluoroelastomer and ZnO as the acid scavenger, see Table 5 E19, had an increased $COF_{static}$ even in the presence of antiblock and slip agents. These results demonstrate the presence of antiblock and/or slip agents may not affect the $COF_{static}$ depending on the formulation of resin, fluoroelastomer and acid scavenger chosen. Furthermore, these results suggest the importance of the polymerization catalyst in the resultant film blocking properties.

Without further elaboration, it is believed that one skilled in the art can, using the description herein, utilize the present invention to its fullest extent. While aspects of the invention have been shown and described, modifications thereof can be made by one skilled in the art without departing from the spirit and teachings of the invention. The aspects and examples described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an aspect of the present invention. Thus, the claims are a further description and are an addition to the aspects of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A polymer composition comprising a metallocene catalyzed linear low density polyethylene, a fluoroelastomer, an acid scavenger and one or more slip agents wherein the slip agent comprises erucamide, oleamide, or combinations thereof.

2. The composition of claim 1 wherein the fluoroelastomer comprises vinylidene fluoride, hexafluoropropylene, chlorotrifluoroethylene, tetrafluoroethylene, perfluoro(alkyl vinyl ether), or combinations thereof.

3. The composition of claim 1 wherein the fluoroelastomer comprises a copolymer of vinylidene fluoride and a comonomer selected from hexafluoropropylene, chlorotrifluoroethylene, 1-hydropentafluoropropylene, and 2-hydropentafluoropropylene; a copolymer of vinylidene fluoride, tetrafluoroethylene, and hexafluoropropylene or 1- or 2-hydropentafluoropropylene; a copolymer of tetrafluoroethylene, propylene and, optionally, vinylidene fluoride; or combinations thereof.

4. The composition of claim 1 wherein the fluoroelastomer further comprises (i) has a weight average particle size of from about 2 and about 10 microns; (ii) has a glass transition temperature ($T_g$) below room temperature and exhibits little or no crystallinity at room temperature; (iii) comprises an interfacial agent of a polycaprolactone having a number average molecular weight in the range of about 1000 to about 32000 in a weight ratio of polycaprolactone to fluoroelastomer of less than about 5:1; or (iv) combinations thereof.

5. The composition of claim 1 wherein the fluoroelastomer further comprises about 60 weight percent caprolactone interfacial agent.

6. The composition of claim 1 wherein the fluoroelastomer is present in an amount of from about 25 ppm to about 2000 ppm by weight of the polyethylene.

7. The composition of claim 1 wherein the acid scavenger comprises a metal stearate, stearic acid, or combinations thereof.

8. The composition of claim 1 wherein the acid scavenger comprises CaSt, ZnSt, LiSt, or combinations thereof.

9. The composition of claim 1 wherein the acid scavenger comprises a metal oxide.

10. The composition of claim 1 wherein the acid scavenger comprises an oxide of zinc.

11. The composition of claim 1 wherein the acid scavenger is present in an amount of from about 25 ppm to about 2000 ppm by weight of the polyethylene.

12. The composition of claim 1 wherein the weight ratio of acid scavenger to fluoroelastomer is from about 1:1 to about 3:1.

13. The composition of claim 1 wherein the linear low density polyethylene is a copolymer comprising 1-hexene.

14. The composition of claim 1 wherein the linear low density polyethylene is catalyzed with a metallocene catalyst and a methylaluminoxane activator.

15. The composition of claim 1 wherein the linear low density polyethylene is catalyzed with a metallocene catalyst and a super solid acid activator.

16. The composition of claim 1 further comprising one or more antiblock agents.

17. The composition of claim 16 wherein the antiblock agent comprises silica, talc, calcium carbonate, or combinations thereof.

18. A composition comprising a metallocene catalyzed linear low density polyethylene, an acid scavenger, a fluoroelastomer, a stabilizer, an antiblock agent, and a slip agent wherein the acid scavenger comprises zinc oxide, zinc stearate, or combinations thereof; the stabilizer comprises a hindered phenol, a phosphate additive, or combinations thereof; the antiblock agent comprises silica, talc, calcium carbonate, or combinations thereof; and the slip agent comprises a fatty acid amide.

19. The composition of claim 18 wherein the metallocene catalyzed linear low density polyethylene comprises from about 0.2 to about 0.5 mol% 1-hexene.

20. The composition of claim 18 further comprising polyethylene glycol, a low molecular weight polyethylene wax; or combinations thereof.

* * * * *